No. 620,410. Patented Feb. 28, 1899.
H. BÖCKMANN.
BRAKE AND SAFETY DEVICE FOR PULLEYS.
(Application filed Dec. 21, 1897.)
(No Model.)
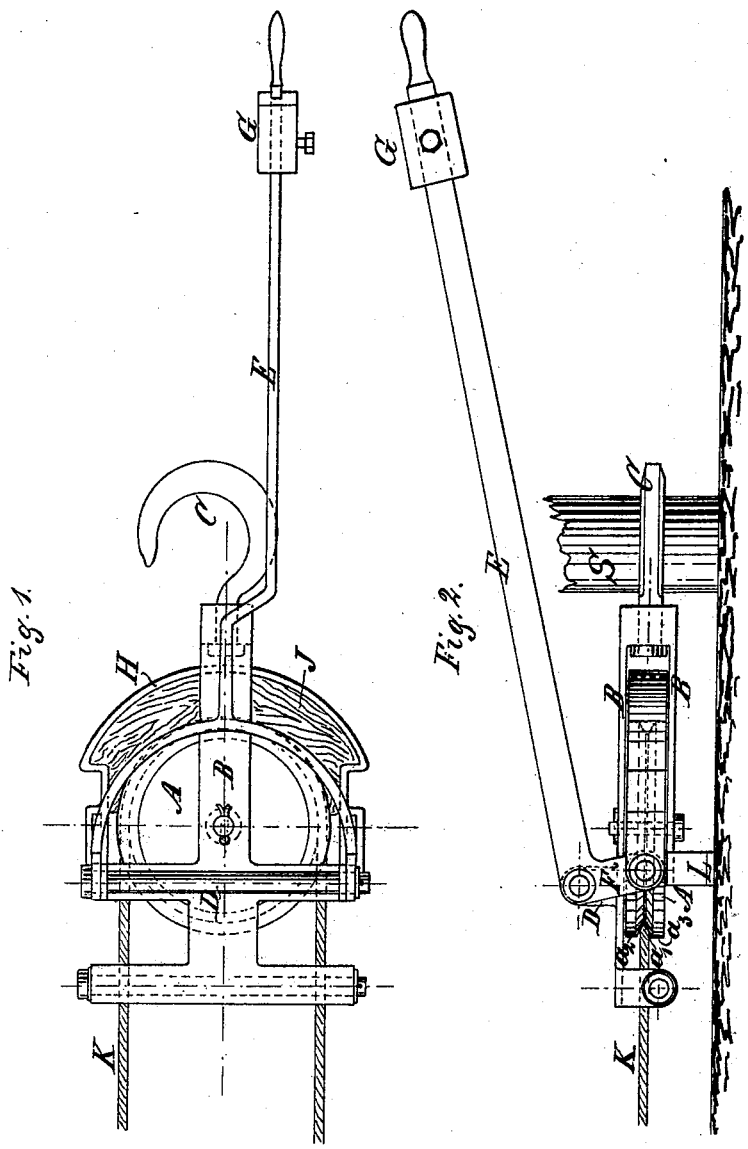
Witnesses:
W. Gumlau
K. Herwig
Inventor:
H. Böckmann
by his Attorney
Max Mirus

UNITED STATES PATENT OFFICE.

HEINRICH BÖCKMANN, OF GLADBECK, GERMANY.

BRAKE AND SAFETY DEVICE FOR PULLEYS.

SPECIFICATION forming part of Letters Patent No. 620,410, dated February 28, 1899.

Application filed December 21, 1897. Serial No. 662,952. (No model.)

*To all whom it may concern:*

Be it known that I, HEINRICH BÖCKMANN, forge-master, of Gladbeck, in Westphalia, German Empire, have invented new and useful Improvements in Brakes for Self-Acting Inclined Planes, of which the following is a specification.

The present invention relates to a braking and safety device for the pulley of a carrier rope or cable.

In the accompanying drawings, Figure 1 shows a plan view of the apparatus, and Fig. 2 a side view.

The carrier-rope K is supported by a pulley A, having a grooved periphery $a'$. This pulley is mounted in a fork B, terminating in a hook C, adapted to engage the shaft or support S. An angle-lever E F is pivoted on a support D, projecting from the fork at one side thereof, and has at its outer end a weight G, while its inner ends below the pivot-point are connected to the extremities of a brake-bow H, carrying a brake-block J. It will be seen that this construction forces the brake-block against the periphery of the pulley A through the lever E F and its weight G.

The pulley A has a groove $a'$, into which the hauling-rope K fits, while the brake-block lies against the circumference $a^2$ $a^3$ on each side of the central groove $a'$. The hook is swiveled to turn in the fork B, so that the whole apparatus can follow the motions of the hauling-rope K. Projections L, fitted to the fork, restrict the oscillations, however, within certain limits. The construction is such that the rope K can never jump off the pulley A, as the brake-block covers the rope-groove $a'$. The brake is always in action, and the hauling can only be proceeded with when the loaded lever E is raised.

The whole apparatus, owing to its simple construction, is of light weight and can be carried by one man from place to place and easily fitted or set up again.

I claim—

In combination with a grooved pulley and rope fitted thereto, a fork supporting the pulley, a brake-block and a forked bell-crank lever pivoted to the fork and having its ends connected to opposite ends of the brake-block, substantially as described.

In testimony that I claim the foregoing as my invention I have signed my name in presence of two subscribing witnesses.

HEINRICH BÖCKMANN.

Witnesses:
   CARL ART,
   WILLIAM H. MADDEN.